(No Model.)  7 Sheets—Sheet 1.
D. E. KEMPSTER.
CASH REGISTER AND INDICATOR.
No. 450,812.  Patented Apr. 21, 1891.
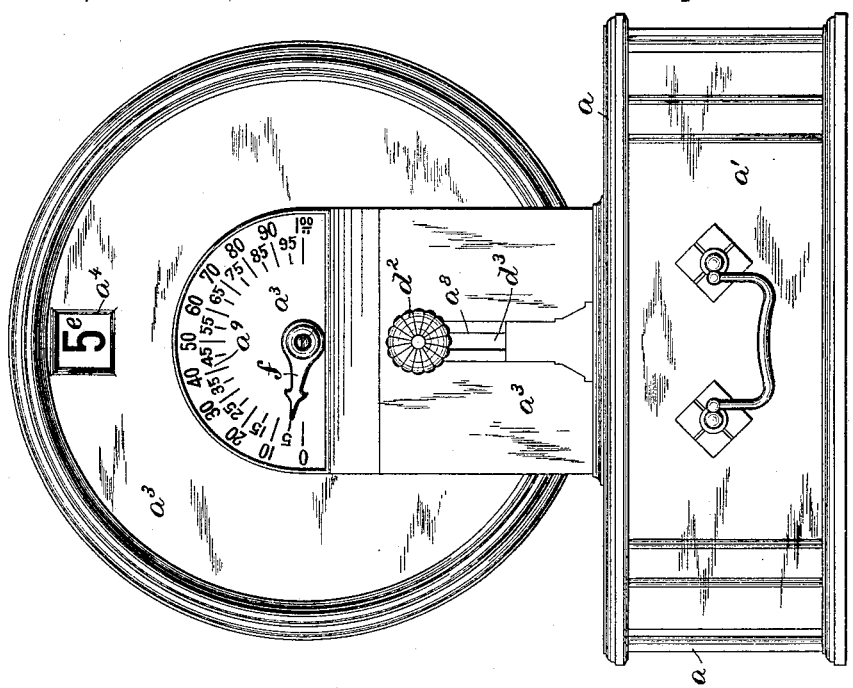
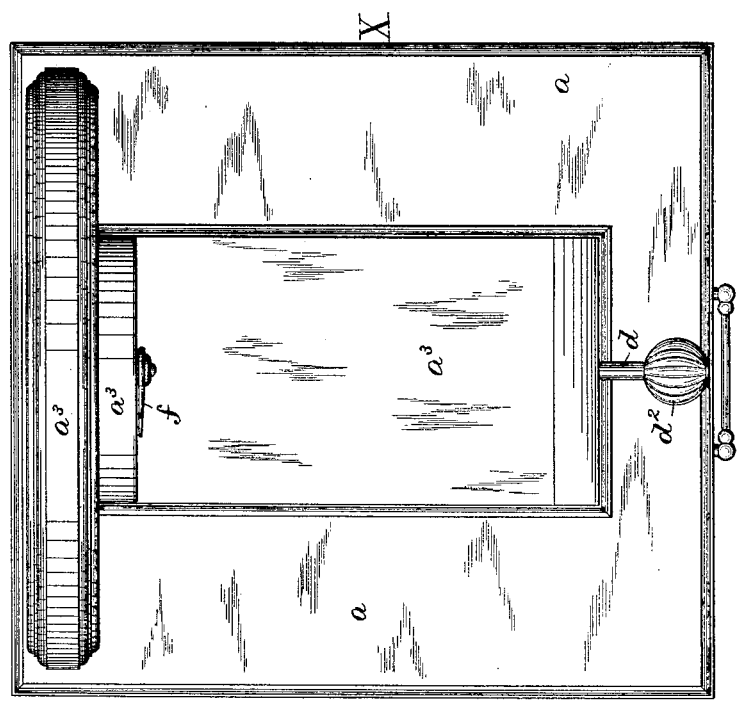
Witnesses
Frank E. Greenwood.
M. H. Avery.
Inventor
Daniel E. Kempster
by Henry Chadbourn
his atty.
THE NORRIS PETERS CO., PHOTO-LITHO., WASHINGTON, D. C.

(No Model.)  7 Sheets—Sheet 2.
D. E. KEMPSTER.
CASH REGISTER AND INDICATOR.
No. 450,812. Patented Apr. 21, 1891.
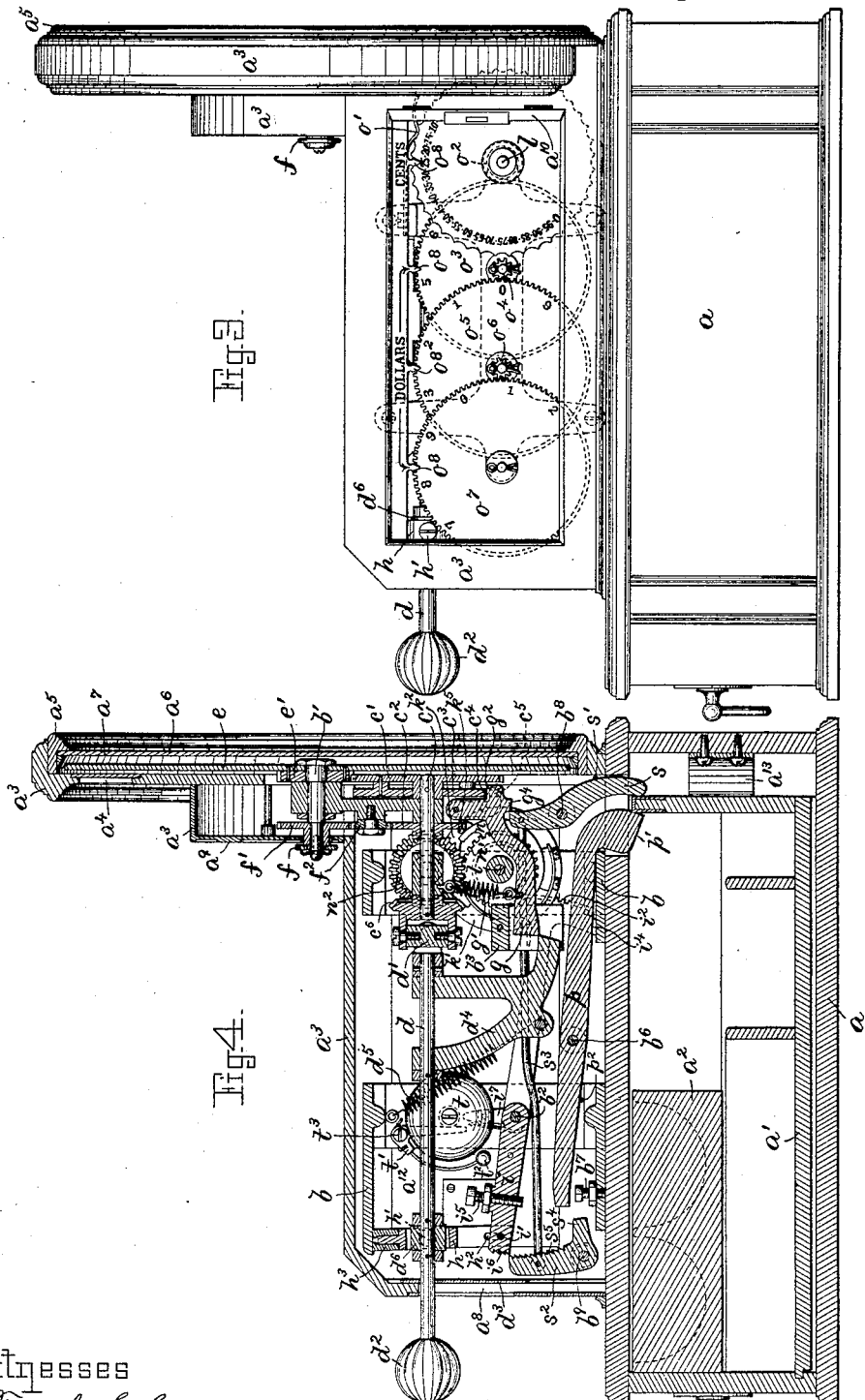
Witnesses
Frank E. Greenwood.
M. H. Avery.
Inventor
Daniel E. Kempster
by Henry Chadbourne
his atty.

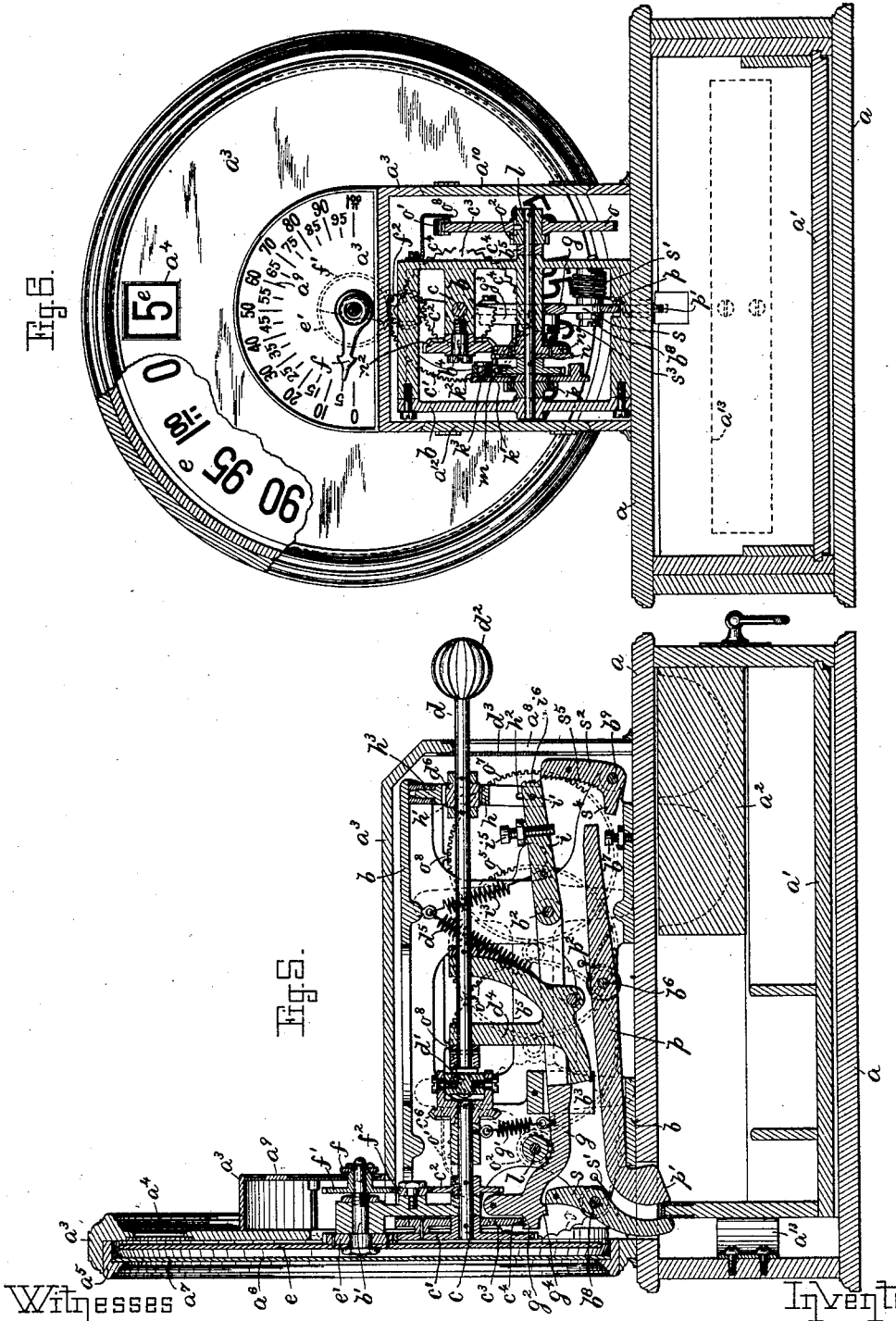

(No Model.) 7 Sheets—Sheet 4.

D. E. KEMPSTER.
CASH REGISTER AND INDICATOR.

No. 450,812. Patented Apr. 21, 1891.

Witnesses
Frank E. Greenwood.
M. H. Avery.

Inventor
Daniel E. Kempster
by Henry Chadbourn
his atty.

(No Model.) 7 Sheets—Sheet 5.
D. E. KEMPSTER.
CASH REGISTER AND INDICATOR.
No. 450,812. Patented Apr. 21, 1891.
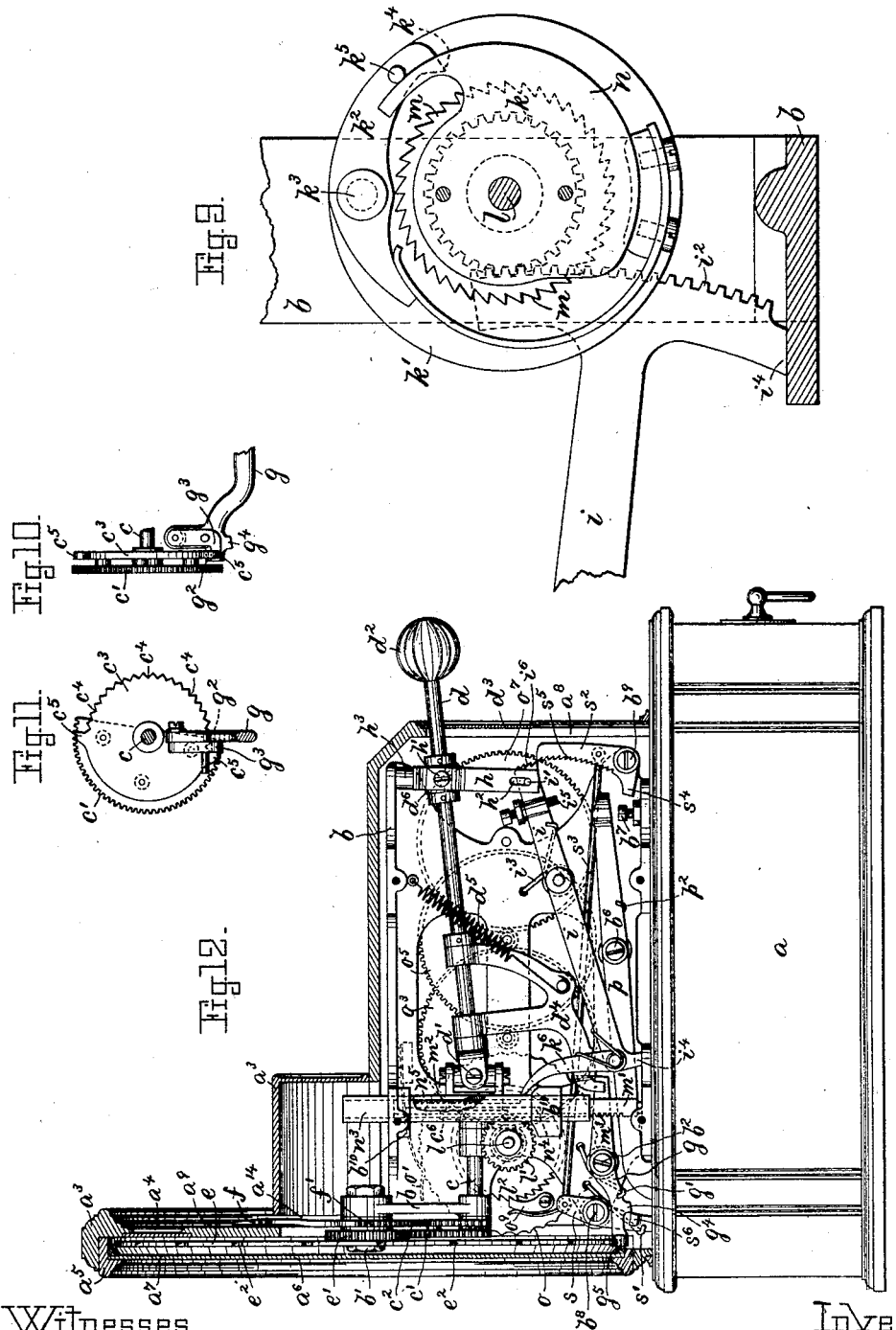
Witnesses
Frank E. Greenwood.
M. H. Avery.
Inventor
Daniel E. Kempster
by Henry Chadbourn
his atty.

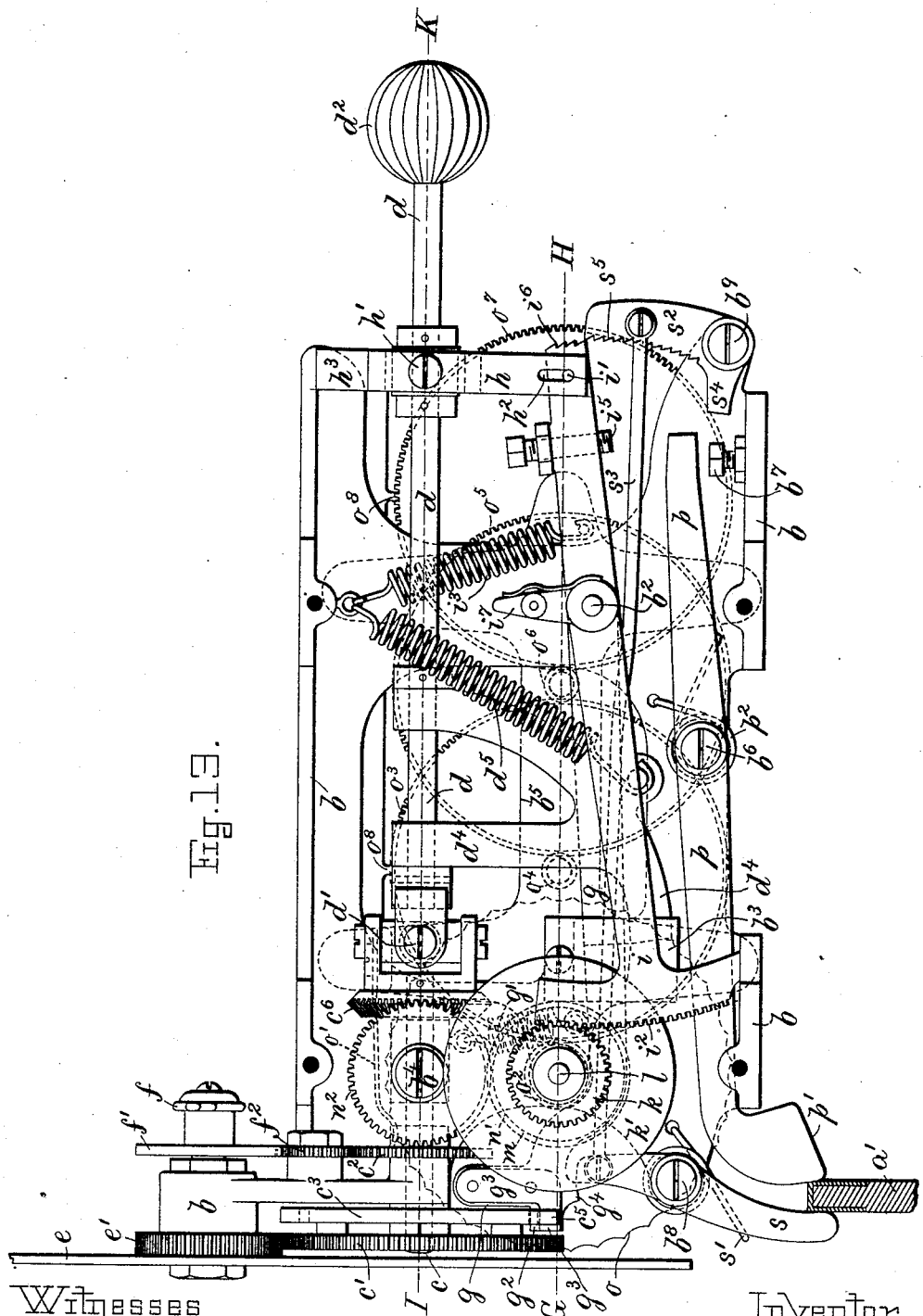

(No Model.) 7 Sheets—Sheet 7.

D. E. KEMPSTER.
CASH REGISTER AND INDICATOR.

No. 450,812. Patented Apr. 21, 1891.

Witnesses
Frank E. Greenwood.
M. H. Avery.

Inventor
Daniel E. Kempster
by Henry Chadbourn
his Atty.

UNITED STATES PATENT OFFICE.

DANIEL E. KEMPSTER, OF BOSTON, MASSACHUSETTS.

CASH REGISTER AND INDICATOR.

SPECIFICATION forming part of Letters Patent No. 450,812, dated April 21, 1891.

Application filed July 21, 1890. Serial No. 359,395. (No model.)

*To all whom it may concern:*

Be it known that I, DANIEL E. KEMPSTER, a citizen of the United States, residing at Boston, in the county of Suffolk and State of Massachusetts, have invented certain new and useful Improvements in Indicators and Registers; and I do hereby declare the following to be a full, clear, and exact description of the invention, such as will enable others skilled in the art to which it appertains to make and use the same.

This invention relates to improvements in indicators and registers in which the amount to be registered is displayed on an indicator seen from outside the case of the machine and is registered and added to the amount already registered, so as to indicate at a glance the gross amount that has been registered on the registering device; and it consists in certain new and convenient combinations of elements whereby the indicating and registering are accomplished by a rotary and radial movement of the operating-handle, substantially as hereinafter set forth, to produce a cheap, simple, compact, easy-operated, and correct register. It is carried out as follows, reference being had to the accompanying drawings, wherein—

Figure 8:
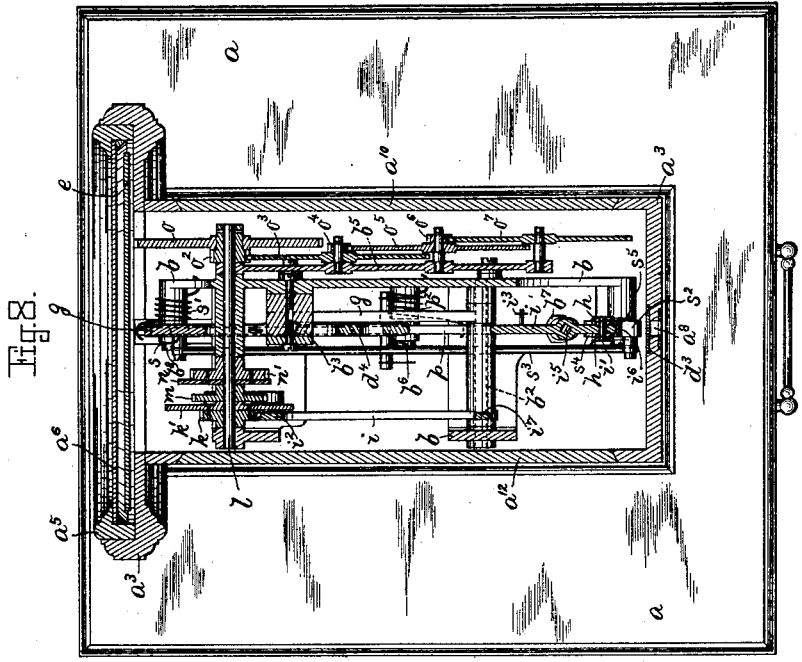
Figure 7:
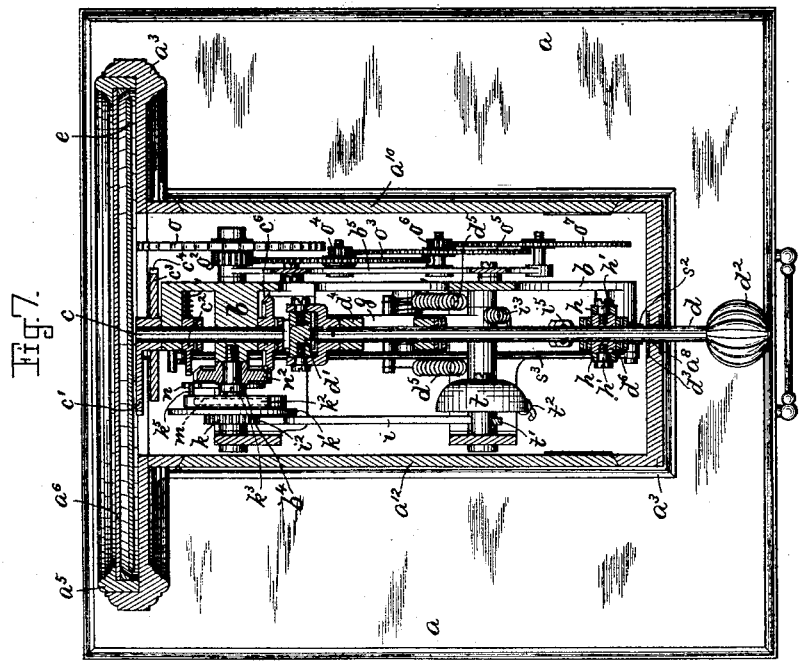
Figure 14:
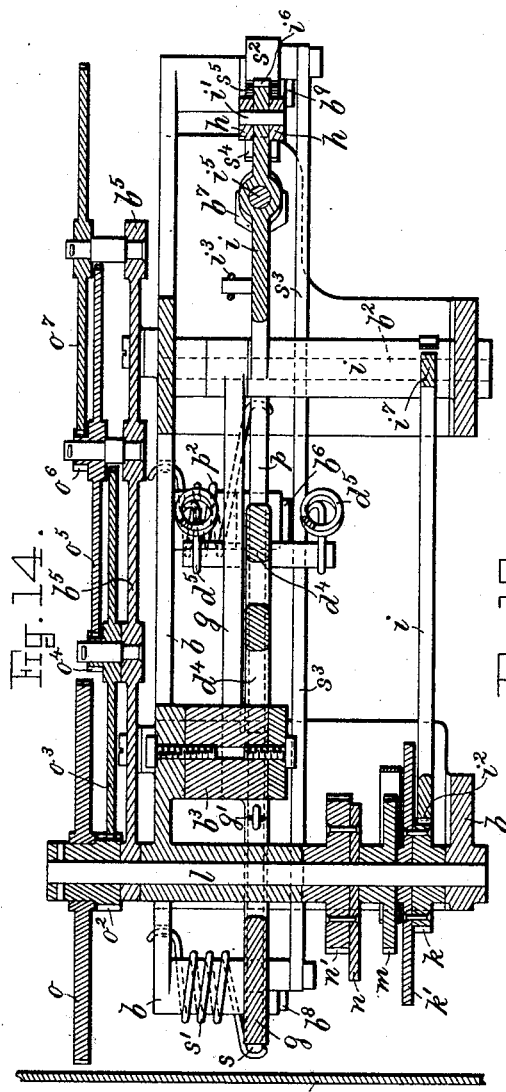
Figure 15:
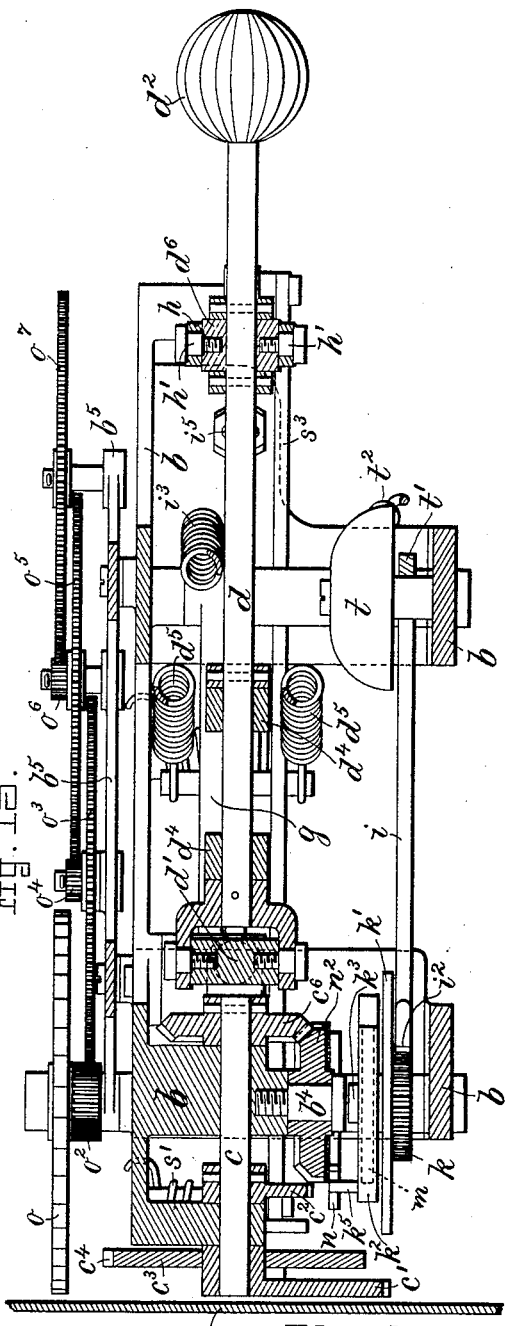

Figure 1 represents a plan view of my improved indicator and register ready for use. Fig. 2 represents a front elevation of the same. Fig. 3 represents a side elevation of the indicator and register, as seen from X in Fig. 1, showing the door in the side of the case open and the registering-wheels exposed to view. Fig. 4 represents a central longitudinal section of the indicator and register, also as seen from X in Fig. 1. Fig. 5 represents a similar section of the indicator and register, looking at the opposite half of the machine from that shown in Fig. 4. Fig. 6 represents a cross-section of the indicator and register on the line A B shown in Figs. 4 and 5, and looking toward the back or indicator of the machine. Fig. 7 represents a horizontal section of the indicator and register on the line C D shown in Figs. 4 and 5, and looking downward upon the base of the machine. Fig. 8 represents a horizontal section of the same on the line E F shown in Figs. 4 and 5, and looking downward upon the base of the machine. Fig. 9 represents an enlarged detail view of the mechanism for operating the registering index-wheels and the manner of governing the amount registered. Figs. 10 and 11 represent detail views of the detent for retaining the indicator in its proper position after it has been set, also a device for varying the amount which can be indicated on the register. Fig. 12 represents a side elevation of a modification of the indicating and registering mechanism, showing the upper portion of the case in section. Fig. 13 represents an enlarged side elevation of the internal operating mechanism of the indicator and register as shown on the other figures of the drawings, excepting on Fig. 12. Fig. 14 represents a cross-section of the same on the line G H shown on Fig. 13, and looking downward. Fig. 15 represents a cross-section of the same on the line I K, also shown on Fig. 13, and looking downward.

Similar letters refer to similar parts on the different parts of the drawings.

The case of the register is made in any desired ornamented style and of sufficient size to contain the mechanism which constitutes the indicator and register. The lower part $a$ of the case is provided with a suitable money-drawer $a'$, having a suitable till $a^2$, if so desired, as is common in cash indicators and registers now in use. Within the upper part $a^3$ of the case, and firmly secured to the top of the lower part $a$ of the same, is placed the main frame $b$, to which all of the operating mechanism is attached.

The case of the register is preferably made in the two parts $a$ and $a^3$, and the frame made so as to attach all of the mechanism thereto, in order to allow the frame and its attached mechanism to be put in working order before it is inclosed within the case, also to obviate the necessity of shipping the entire case to the factory or other place when any repairs are needed in the operating mechanism, it being only necessary to remove the frame $b$ and its attached mechanism intact from the case and to send it to be repaired.

In bearings on the frame is journaled the main driving-shaft $c$ of the machine, to the forward end of which is attached the operating-handle or hand-lever $d$ by means of the universal joint $d'$, for a purpose to be described hereinafter. To the rear end of the main shaft is firmly secured the spur gear or sector $c'$, which meshes into the spur-gear $e'$, loosely journaled on the stud or bolt $b'$ on the rear part of the frame, and to said gear $e'$ is attached the circular indicating dial or disk $e$, having suitable numerals arranged peripherally on one or on both faces of said dial. It will be seen that if the main shaft is rotated in its bearings a rotary motion will be imparted to the indicating-dial. An aperture $a^4$ of sufficient size to expose to view one of the numerals on the dial is made through the rear portion of the case, across which aperture the numerals pass when the dial is rotated. This aperture is preferably provided with a pane of glass or other suitable transparent material to prevent dust or other substance from entering the case at this point and to allow the figures on the dial to be read from outside the case. I have shown that portion of the case behind the dial as made in the form of a circular frame $a^5$, let into and firmly secured to the case. This frame preferably contains a mirror $a^6$, as shown, which mirror is provided with an aperture $a^7$, (made by the removal of a portion of the plating thereon,) of an equal size and directly opposite the aperture $a^4$ in the case to expose the numeral on the back of the dial corresponding to the one on front of the dial exposed by the aperture $a^4$. This construction of the rear of the case is desirable when the indicator and register are to be used in a place where the back of the same is in view of the customer whose purchase is to be indicated thereon, as it presents a neat and attractive appearance; but such construction may be dispensed with and the back of the case made whole, if so desired.

The forward end of the hand-lever $d$ extends through a slot $a^8$ in the case, and is provided on its outer end with a suitable knob or handle $d^2$. This knob or handle is preferably made fluted, as shown, so as to prevent it from slipping in the hand of the operator while he is in the act of manipulating the machine, as described hereinafter.

To the shaft $c$ is firmly secured the spur gear or sector $c^2$, which conveys a rotary motion to the spur gear or sector $f'$, loosely mounted on the forward end of the stud or bolt $b'$ through the medium of the intermediate pinion $f^2$. The hub of the sector $f''$ projects through a perforation in the case, and is provided on its outer end with the index-finger $f$, which is so arranged as to point to a numeral of the same denomination on an index $a^9$ on the front of the case to that on the dial exposed to view by the apertures $a^4$ and $a^7$. This index, with its index-finger and operating mechanism, is used to facilitate the setting of the indicating-dial $e$ to indicate the right amount of the sale, as it is easier to follow the movement of the index-finger than to watch the figures on the dial as they pass by the aperture in the case until the right figure comes in view; but said index and index-finger may be dispensed with and the indicator set by watching the numerals on the dial until one of the right denomination is exposed by the aperture $a^4$; also the connecting mechanism between the shaft $c$ and dial $e$ and between the shaft $c$ and index-finger $f$ may be varied at will within the scope of mechanical skill without departing from the spirit of this portion of my invention, as all that is necessary is to furnish means whereby said dial and index-finger will be operated relatively one with the other so as to indicate like numerals when the driving-shaft $c$ is rotated.

A lever $g$ is pivotally mounted on a shaft $b^2$ on the frame of the machine, and is provided with a spring $g'$, which tends to draw its free end toward the shaft $c$. The rear end of this lever is provided with a V-shaped tooth $g^2$, (shown in Fig. 10,) which enters correspondingly-shaped recesses $c^4$ $c^4$ on the periphery of the disk $c^3$, attached to and concentric with the sector $c'$ on the shaft, said lever forming a detent to hold the dial $e$ in its proper position after it has been set and during the manipulations of the machine, described hereinafter. The number of recesses on the disk $c^3$ correspond to the number of figures on either side of the dial.

The disk $c^3$ is also provided with a projection $c^5$ on its periphery at each end of the series of recesses therein, as shown in Figs. 10 and 11, which projections form stops to limit the amount of rotation of the shaft $c$ by said stops coming in contact with the sides of the lever $g$ or with the dog $g^3$ attached thereto, the object of the latter being to prevent the shaft from rotating sufficient to indicate zero (0) on the dial and index when the dog is in the position shown on the drawings; but by swinging said dog on its fulcrum sufficient to remove the end thereof back from the path of the stop projection as it rotates, the shaft will be allowed to rotate until the stop projection moves by the end of the dog and comes in contact with the side of the detent-lever, and thus indicating zero on the indicator and index. The dog is held in its proper position after it is set by means of any suitable friction device applied to the fulcrum on which said dog turns or by any other and well-known manner. The lever $g$ is prevented from moving sidewise by being guided in a guide-block $b^3$ on the frame or other stationary part of the machine.

The above-described mechanism constitutes the indicator portion of my invention, and it is operated by applying a rotary motion to the hand-lever $d$ upon its longitudinal axis, and, through its connection to the main shaft $c$, imparting a corresponding motion thereto, which moves the indicating-dial and index-finger. It will be seen that the hand-lever $d$, being attached to the main shaft $c$ by the universal joint $d'$, is capable of a radial movement at its forward end within a slot in the forward part of the case $a^3$, as shown, and is provided with a plate or slide $d^3$, loosely mounted upon it and guided in suitable guides in the case, so as to close the slot against the entrance of dust and to prevent any one from reaching the interior mechanism of the register through this slot whenever the hand-lever is in its normal position, as shown on the drawings. A bracket $d^4$ is loosely mounted on the hand-lever, the lower end of said bracket being guided in the guide-block $b^3$ and forming a lock against the indicator-dial being changed after the hand-lever has been moved from its normal position, on account of the end of said bracket being moved under and resting against a portion of the detent-lever $g$, and preventing the same from turning on its fulcrum and the tooth $g^2$ on the end thereof from being forced out of the recess in the disk $c^3$ in which it rests.

Suitable springs $d^5$ $d^5$ are attached at one end to the bracket $d^4$ and at the other end to any stationary part of the machine, one on each side of the bracket and in such a position as to tend to hold the hand-lever at all times in its normal position, as shown on the drawings.

On the forward end of the hand-lever $d$ and within the case of the machine is loosely mounted the collar $d^6$, which is kept from moving lengthwise on the hand-lever by means of two collars firmly attached to the hand-lever—one on each side of the collar $d^6$. To this collar is pivoted the link $h$ by means of the screws $h'$ $h'$, as shown in Fig. 7.

A lever $i$ is loosely mounted on the shaft $b^2$ on the frame of the machine, and is pivotally attached at its forward end to the forked lower end of the link $h$ by means of the pin $i'$, which enters and is free to move within the slot $h^2$ in the lower end of the link in such a manner as to allow the hand-lever to turn on the universal joint until the pin reaches either end of the slot without moving the lever $i$ upon its fulcrum. The rear end of the lever $i$ is made in the form of a sector $i^2$, which meshes into the spur-gear $k$, loosely mounted on the register-shaft $l$.

The lever $i$ is provided with a suitable spring $i^3$, attached at one end to said lever and at the other end to any stationary part of the machine, which spring has a tendency to keep the lever in the position shown on the drawings—that is to say, with the forward end of said lever at its highest position and with the stop projection $i^4$ on the rear end of the lever resting against the frame of the machine and forming a stop to prevent the lever $i$ from being thrown too far by the momentum of the lever when the hand-lever is allowed to suddenly return to its normal position, and is stopped by the stop $h^3$ on the link $h$ striking the frame $b$.

A spring-pressed pawl $k^2$ is pivoted at $k^3$ to the disk $k'$, and is provided at one end with a tooth $k^4$, adapted to engage the teeth of the ratchet-wheel $m$, which latter is made fast to the shaft $l$. The disk $k'$ is attached to the spur-gear $k$ or made in one piece therewith, and it will be seen that when the hand-lever $d$ is moved radially a rotary motion is imparted to the pawl-carrying disk through the medium of the sector $i^2$ and gear $k$, and the tendency of the pawl mounted thereon is to engage the tooth on the end of the pawl with one of the teeth on the ratchet-wheel $m$, and thereby to rotate the shaft $l$; but said pawl is prevented from engaging the ratchet-wheel during a portion of the rotation of the pawl-carrying disk by means of an adjustable cam-shaped guard or gage $n$ and a pin or roll $k^5$, (shown in Fig. 9,) projecting from the side of the pawl and resting on the cam-shaped periphery of the guard and gage for a purpose to be described hereinafter.

On the main shaft $c$ is firmly attached the bevel-gear $c^6$, which meshes into the bevel-gear $n^2$, loosely mounted on a stud or bolt $b^4$ on the bearing for the main shaft $c$ in the frame $b$. This latter bevel-gear is made also to form a spur-gear, which meshes into a spur-gear $n'$, loosely mounted on the shaft $l$, and to which the cam-shaped guard and gage $n$ is firmly attached or made in one piece therewith. It will be seen that whenever a rotary motion is given to the main shaft to indicate the desired amount on the indicating-dial a similar and proportional motion will be imparted to the cam-shaped guard or gage around the shaft on which it is mounted through the medium of said bevel and spur gears, thus automatically adjusting the guard or gage for the purpose described hereinafter.

On the end of the shaft $l$, outside of the frame $b$, is firmly mounted the gear $o^2$, on the hub of which is firmly secured the registering-wheel $o$, which is notched on its periphery and provided with a suitable spring-detent $o'$, (substantially as shown in Fig. 6 and in dotted lines in Figs. 3, 5, and 13,) to prevent the registering-wheel and the shaft on which it is mounted from turning after the desired amount has been registered on said wheel and while the hand-lever and its connected mechanism are returning to their normal position, or from any other cause, excepting when it is desired to register a given amount on the wheel by the register-operating mechanism.

Upon the registering-wheel $o$ is registered the lowest denomination of the moneys to be registered on the register, and on the drawings I have shown such moneys to be dollars and cents, and the amount capable of being registered thereon at one operation of the register to be five cents or any multiple thereof to and including one dollar.

It will be obvious to any mechanic that the amounts registered at one operation of the register and the denominations of the moneys registered thereon might be changed at will by simply changing the figuring of the registering-wheel and the relative sizes of the gears and levers contained in the case and substituting suitable bearings on the frame for the ones shown.

A suitable train of gears $o^3$, $o^4$, $o^5$, $o^6$, and $o^7$ are arranged to mesh into the gear $o^2$ in such a manner as to register the higher denominations of the moneys to be registered, and on the drawings I have shown the gears $o^3$, $o^5$, and $o^7$ as having figures thereon to register dollars, respectively, by units, tens, and hundreds. The above train of gears are mounted on suitable studs on an auxiliary frame $b^5$, as shown in Figs. 7, 8, 14, and 15, which frame is attached to the main frame by screws or equivalent devices, so as to be removed from it intact, if so desired. This construction is not essential, however, as the train of gears might be mounted on studs on the main frame and work to equal advantage without departing from my invention.

A suitable stationary index-finger $o^8$ is provided for each of the registering-wheels or gears to assist in reading the amount registered on such wheels. The registering-wheels, with their index-fingers, are exposed to view by simply opening the door $a^{10}$ on the side of the case, as shown in Fig. 3.

It will be obvious to any mechanic that the style of register attached to the registering-shaft $l$ and operated thereby might be varied according to the requirements of the register without departing from the spirit of my invention, and that the train of gears in the register might be prolonged, so as to register any required amount.

The door $a^{10}$, as well as the door $a^{12}$ on the opposite side of the case, is provided with a suitable lock and key, and is kept locked at all times, excepting when desired to read the gross amount registered, or to oil, inspect, or repair the interior mechanism of the machine.

The amount of rotary motion imparted to the pawl-carrying disk $k'$ by the radial movement of the hand-lever $d$, through the connecting mechanism between said disk and hand-lever, is always the same and is sufficient to cause the pawl $k^2$ to rotate the ratchet-wheel $m$ enough to register the largest amount which can be indicated by the indicating-dial $e$, and therefore the largest amount required to be registered at any one operation, provided, however, that the pawl is allowed to engage the ratchet-wheel at the beginning of the movement of the pawl and its disk around the shaft on which it is mounted; but any portion of this amount can be registered by preventing the pawl from engaging the ratchet-wheel during such a part of its movement as to leave enough of the movement of the pawl to register the desired amount, and by supplying that portion of the ratchet-wheel traveled by the movement of the pawl with a suitable number of teeth to correspond to the number of divisions into which it is desired to divide the largest amount which can be indicated and registered.

The holding of the pawl from engaging the ratchet-wheel during any portion of the movement of the pawl I accomplish by the use of the pin $k^5$ on the side of the pawl, and the adjustable cam-shaped guard or gage $n$, on the cam-periphery of which the pin moves during any desired part of the movement of the pawl, and as said guard is properly adjusted automatically, as heretofore described, during the operation of setting the indicating mechanism to indicate the desired amount, it will be seen that the same amount must be registered on the register that is indicated by the indicator.

In the drawings I have shown the mechanism which operates the register as being actuated by a movement of the hand-lever in a radial line downward from the position it occupies while actuating the indicator; but it will be obvious that the connecting mechanism between the hand-lever and the register might be varied within the scope of mechanical skill so as to actuate the register by a radial movement of the hand-lever in any other direction without departing from the spirit of my invention; also, that the indicator might be operated by the radial movement of the hand-lever and the register operated by the rotary movement of the same, if so desired. The rotary movement upon its longitudinal axis and the downward radial movement of the operating handle or lever $d$ are both movements which can be easily and rapidly performed by the hand of the operator, and movements which the hand is accustomed to make. Consequently the employment of such movements to perform the indicating and registering of the desired amount adds greatly to the convenience and speed of the machine.

The drawer operating and locking mechanism is carried out as follows: The lever $p$, having its fulcrum at $b^6$ on the frame, is so arranged that its forward end is in the path of the forward end of the lever $i$, and is caused to move on its fulcrum when the latter is depressed by the downward movement of the hand-lever. The rear hooked end of the lever $p$ extends downward through a perforation in the top of the base of the case and forms a latch $p'$ for locking the drawer $a'$ in its closed position, as shown on the drawings. A spring $p^2$ tends to hold the lever in the position shown on the drawings. An adjustable screw-stop $b^7$ is attached to the base of the frame of the machine, against which the forward end of the drawer-locking lever strikes when it is depressed by the hand-lever. It is so adjusted as to allow the forward end of the drawer-locking lever to be depressed just enough to disengage the hooked rear end of said lever from the drawer to unlock the same. The drawer is then forced open the required distance by the influence of a suitable spring $a^{13}$, interposed between the interior of the back of the base of the case and the back of the drawer.

The drawer may be supplied with anti-friction rolls to allow it to be moved more easily by the spring $a^{13}$; but such rolls have not been shown on the drawings, as they are common and well known. If so desired, any suitable stop may be applied to the drawer to prevent it from being opened too far by the spring $a^{13}$, or from any other cause whatsoever. The downward movement of the hand-lever is limited and adjusted by means of the set-screw $i^5$, which is screwed through the forward end of the lever $i$, and is adapted to strike against the forward end of the drawer-locking lever $p$, moving it on its fulcrum, the drawer-locking lever being limited in its movement by the screw-stop $b^7$, above described.

To prevent the indicating mechanism from being operated while the drawer is in any other than a locked position, a locking-lever $s$ is pivoted at $b^8$ to the frame of the machine, the lower end of which projects through a perforation in the top of the base portion of the case and rests against the rear of the back of the drawer $a'$. The upper end of said lever is adapted to move in the same vertical plane as the end of the detent-lever $g$, and is just in front of a downward projection $g^4$ on said detent-lever. A spring $s'$ tends to move the lever $s$ on its fulcrum and to cause the lower end thereof to rest against and to move forward with the back of the drawer when the drawer is forced open by the influence of the spring $a^{13}$ after it has been released by the drawer-locking lever $p$. The forward movement of the lower end of the locking-lever $s$ causes the upper end of said lever to move backward until the top of the lever is under and rests against the downward projection $g^4$ on the detent-lever. This prevents the tooth on the end of the detent-lever from being forced from the recess in the disk $c^3$, within which it rests, and therefore locks the indicator and its operating mechanism in the position they had assumed when the drawer commenced to open. The movement of the locking-lever $s$ on its fulcrum, caused by the influence of the spring $s'$, as above described, is limited by a stop, to be described hereinafter, in connection with other parts of the machine.

To prevent the registering mechanism from being operated while the drawer is in any other than a locked position, a second locking-lever $s^2$ is pivoted at $b^9$ to the forward part of the frame of the machine, said lever being in the same vertical plane as the lever $i$, which operates the register, and of such a length that the upper end thereof will just move under and against the under side of the forward end of said registering-lever when the registering-lever is in its upper position and will prevent the registering-lever from being forced downward by the hand-lever. The locking-lever $s^2$ is preferably made sufficiently wide to project under the lower end of the link to prevent the same from being moved downward by the hand-lever, and it has been shown so on the drawings in Figs. 8 and 14. The locking-lever $s^2$ is connected to the locking-lever $s$ by means of the connecting-rod $s^3$ in such a manner that they are moved together by the spring $s'$, and as the latter is allowed to move only by the opening of the drawer the former will be governed by the same.

The locking-lever $s^2$ is provided with a projection $s^4$, which forms a stop against the frame of the machine to limit the movement of the locking-levers. When the drawer is closed, the back surface of the locking-lever $s^2$ is preferably made to coincide with the arc of the circle through which the extreme forward end of the lever $i$ travels when it is depressed by the hand-lever, said surface being preferably provided with the ratchet-teeth $s^5$, as shown on the drawings, and the extreme end of the lever $i$ also being provided with the ratchet-teeth $i^6$, as shown on the drawings. This construction prevents the hand-lever from being forced downward, and the registering mechanism operated during the return of the hand-lever to its normal position after it has reached the limit of its downward movement and unlocked the drawer.

The locking-levers $s$ and $s^2$ are used when it is desired to prevent the register and indicator from being used when the money-drawer is in any other than a closed position; but said levers may be dispensed with, so as to be able to operate the indicator and register with the drawer open, or said levers may be prevented from locking the register and indicator by simply placing a wedge under the projection $s^4$ on the locking-lever $s$ between said projection and the base of the frame.

A gong or bell $t$ is attached to a convenient stationary part of the machine, and has connecting mechanism to any movable part of the register-operating or drawer-opening mechanism as to be struck when the hand-lever reaches its lowest movement and has opened the drawer and registered the desired amount. On the drawings the gong-striking mechanism is shown as connected to the register-operating lever $i$, and consists of the joined projection $i^7$ on the upper part of said lever, which presses against and operates the spring-pressed hammer-lever $t'$ in such a manner that the hammer-lever, with its attached hammer $t^2$, is turned on its fulcrum $t^3$ against the influence of the spring on the hammer-lever during the downward movement of the hand-lever and is released, and the gong struck at the same time that the drawer is opened and the amount has been registered on the registering-wheels. The joint in the projection $i^7$ allows it to pass by the hammer-lever $t'$ when it is returned to its normal position by the hand-lever.

The operation of my improved indicator and register is as follows: The salesman having made a sale which he wishes to indicate to the customer and to register on the registering-wheels, he grasps the knob $d^2$ and rotates the hand-lever, also the index-finger $f$ and indicating-dial $e$ through the connecting mechanism between said parts until the index-finger points to the figure on the index $a^9$, representing the amount desired to be registered, at the same time exposing a figure of the same denomination on the indicating-dial through the apertures $a^4$ and $a^7$ in the case. During the above operation the cam-shaped guard or gage $n$ has been automatically adjusted on the shaft $l$ by the connecting mechanism between said guard and the hand-lever, so that the portion of the ratchet-wheel $m$, exposed to the operation of the pawl $k^2$, is sufficient to move the registering-wheel $o$ enough to register the desired amount thereon. The salesman, still holding the indicator properly set, moves the end of the hand-lever radially within the slot in the front of the case, which locks the indicator by the lower end of the bracket $d^4$, passing under and against the detent-lever $g$, as above described, also by its connection to the pawl-carrying disk $k'$ it rotates said disk and the pawl $k^2$ mounted thereon until the hand-lever reaches the extreme end of the downward movement of said lever, causing the adjusting-screw $i^5$ to come in contact with the forward end of the drawer-locking lever $p$, and moving said lever on its fulcrum, so as to unlock the drawer $a'$ and until it comes to a stop against the adjustable screw-stop $b^7$ on the base of the frame. At the same time that the movement of the hand-lever unlocks the drawer, the projection $i^7$ on the lever $i$ strikes the gong $t$, which shows that the hand-lever has been moved to the extreme end of its stroke and has registered the entire amount indicated on the indicating-dial. During the rotation of the pawl-carrying disk $k'$ and the pawl $k^2$, mounted thereon, around the shaft $l$, the pawl has been kept from engaging the teeth of the ratchet-wheel $m$ by the cam-shaped guard $n$ and the pin $k^5$ on the pawl a sufficient portion of the movement of said pawl to allow it to move the ratchet-wheel $m$ by the remainder of its stroke enough to register on the registering-wheel $o$ and the train of registering-gears connected therewith the amount indicated by the indicating-dial. When the drawer is unlocked by the lever $p$, it is forced open by the influence of the spring $a^{13}$ in a similar manner to those now in common use, and as the drawer is thrown open the lower end of the locking-lever $s$ has a tendency to follow the drawer; but is prevented from so doing by the toothed forward end of the lever $i$ resting against the rear toothed surface of the locking-lever $s^2$ as long as the hand-lever is in any other than its normal position; but when the hand-lever reaches its upper or normal position the spring on the locking-lever $s$ will cause said lever $s$ to move under and against the projection $g^4$ on the detent-lever $g$ and lock the indicating-dial. At the same time the locking-lever $s^2$ will be moved by the connecting-rod under and against the forward end of the lever $i$ and link $h$, thereby locking the hand-lever in its upper position. If the operator should attempt by accident or from other cause to force the hand-lever down after it has unlocked the drawer and commenced to return from its lowest position, and thereby make a false registry, he would be prevented by the teeth on the lever $i$ locking into the teeth on the locking-lever $s^2$; but said teeth are made so as to allow the hand-lever to return freely to its upper or normal position.

In Fig. 12 is shown a modified form of my indicator and register in which a ratchet-toothed straight rack $m'$ is used instead of the ratchet-wheel $m$ of the machine above described, which rack is operated by a spring-pressed pawl $k^6$, pivoted direct to the end of the registering-lever $i$, instead of using the pawl $k^2$, pivoted to the disk $k'$, which is operated by a sector $i^2$ and gear $k$, as in the machine before described. Thus it will be seen that the sector-gear and disk in the former machine are dispensed with in this modification. A tubular guard or gage $n^3$, movable upon and incasing the rack $m'$, is used in the place of the cam-shaped guard or gage $n$ of the former machine, said tubular guard being adjusted up and down on the rack by means of a rack $n^4$, (shown in dotted lines in Fig. 12,) attached to the side of the tubular guard or made in one piece therewith, which rack meshes directly into the gear $c^6$ on the main shaft, thus dispensing with the connecting mechanism between the gear $c^6$ and the cam-shaped guard $n$ of the before-described machine, consisting of a bevel-gear $n^2$ and a spur-gear $n'$. This tubular guard, with its inclosed rack, is guided in the bearings $b^{10}$ and $b^{10}$ on the main frame. The front of the tubular guard is provided with a slot $n^5$ to allow the pawl $k^6$ on the lever $i$ to enter and engage the ratchet-teeth $m^3$ on the rack $m'$ left exposed by the slot. The rack $m'$ is provided with the spur-teeth $m^3$, meshing into the teeth of the spur-gear $l'$, fast upon the register-shaft $l$, which gear enters the tubular guard through a slot on the back of said guard. (Not shown on the drawings.) The registering-wheel $o$, Fig. 12, is loosely mounted on the shaft $l$, and is provided with the spring-pressed pawl $o^9$, which engages the ratchet-wheel $l^2$, fast on the shaft $l$, whenever the hand-lever is depressed, turning the registering-wheel $o$ more or less according to the position of the tubular guard. The registering-wheel is held in a stationary position by the spring-detent $o'$ on the frame of the machine, the ratchet-wheel being allowed to rotate freely with the shaft $l$ under the pawl during the return of the rack $m'$ to its normal position caused by a torsional spring arranged on the shaft $l$, but not shown in the drawings. The index $a^9$ is shown as being arranged on the case just below the aperture $a^4$ and the index-finger $f$ made in one piece with the sector $f'$, said finger projecting through and traveling in a slot $a^{14}$ in the case. The sector $c^2$, which actuates the index-finger, is placed at the rear end of the driving-shaft, and is attached to the sector $c'$, which actuates the indicator. The detent-lever $g$ is changed in this modification from a lever having its fulcrum at one end of the lever to one having its fulcrum in the center of the lever, and it is provided on its end with a roll $g^5$ in the place of a tooth $g^2$, which roll enters recesses $e^2\ e^2$ on the periphery of the indicating-dial to retain said dial in its proper place after it has been set. The lower end of the bracket $d^4$ is forked and guided by the forward end of the detent-lever entering the forked lower end of the bracket. The bracket is so arranged that its lower end will move above and against the upper side of the forward end of the detent-lever and lock the indicating dial in its proper position when the hand-lever is depressed. A projection $s^6$ is arranged on the locking-lever $s$, so as to be moved under and against the under side of the projection $g^4$ on the detent-lever to lock the indicating-dial while the drawer is unlocked. The hand-lever has been shown in the modification as arranged at an angle to and a little above the level of the line of the center of the main shaft when at its normal position; but the normal position of said hand-lever in relation to the main shaft is not essential if it is only possible to rotate the main shaft by the rotation of the hand-lever when in its normal position.

In this modification I have shown a few of the changes in the forms of the operating mechanism which may be used to operate the indicator and register; but it will be obvious to any mechanic that other forms might be used to equal advantage without departing from the essential features of my invention, which consists, broadly, in an indicator and register the indicating device and registering device of which are operated by a rotary and a radial movement of the operating-handle or hand-lever through suitable connecting mechanism between said parts, also combining with such a construction means whereby the amount to be registered is automatically gaged during the setting of the indicating device so as to register on the registering device a like amount to that indicated on the indicating device or vice versa, and also combining means for detecting fraud should the operator attempt to register less than he indicates.

In all of the drawings I have shown the indicating-dial $e$ as arranged to rotate so that the numerals thereon will pass and be exposed to view through the apertures in the case of the machine; but it will be obvious to any mechanic that said dial might remain stationary and a second dial provided with an aperture might be operated by the dial-operating mechanism so as to expose the desired numeral on the stationary dial through the aperture in the movable dial; also that the index-finger $f$ might be made stationary and the index $a^9$ made in the form of a dial or a portion of a dial arranged to rotate by said stationary index-finger within the scope of my present invention.

Having thus fully described the nature, construction, and operation of my invention, I wish to secure by Letters Patent and claim—

1. In a machine for indicating and registering amounts, the combination, with an indicating mechanism and a registering mechanism, of an operating handle or lever having a rotary motion upon its longitudinal axis and a radial movement to and from the center on which it rotates and connecting mechanism between said handle or lever and said indicating and registering mechanism, whereby the amounts may be indicated and registered by rotary and radial movements of the operating-handle, substantially as set forth.

2. In a machine for registering amounts, the combination, with a registering mechanism and its operating handle or lever having a rotary motion upon its longitudinal axis and a radial movement to and from the center on which it rotates, of connecting mechanism between said handle or lever and said registering mechanism, whereby the amount to be registered is first fixed and determined by the rotary movement of said handle or lever, and then registered by the radial movement of said handle or lever, substantially as described.

3. In an indicator and register, the combination, with an indicating device, of an operating hand-lever having a rotary motion upon its longitudinal axis and a radial motion to and from the center on which it rotates, as described, a connecting mechanism between the indicating device and operating hand-lever, and a locking device, whereby said indicating device is locked and unlocked by the radial movement of said operating hand-lever, for the purpose set forth.

4. In an indicator and register, an operating hand-lever, an indicating device operated by a rotary motion of said lever, a registering device operated by a radial motion of said lever, combined with means, substantially as described, whereby the indicating device is locked in position during the radial motion of the operating hand-lever, for the purpose set forth.

5. In an indicator and register, a case to contain the operating mechanism, an indicating-dial within said case, having numerals arranged upon said dial, an aperture in said case adapted to expose the numerals on said dial one at a time, an operating hand-lever having a limited rotary motion upon its longitudinal axis and a radial movement to and from the center on which it rotates, and connecting mechanism between said dial and hand-lever to operate substantially as described, combined with an index on the case, an index-finger adapted to move on said index, and connecting mechanism between said operating hand-lever and index-finger, whereby said index-finger and indicating-dial are operated conjointly, for the purpose set forth.

6. In an indicator and register, a case, a drawer in said case, an indicating-dial, an operating handle or lever having a rotary motion upon its longitudinal axis, connecting mechanism for operating said dial by said handle or lever, and a detent-lever on said mechanism, combined with a locking-lever adapted to be held disengaged from the detent-lever by the drawer while the drawer is closed, but engaging said lever when the drawer is open, whereby the indicating-dial is locked in position during the time that the drawer remains open, for the purpose set forth.

7. In an indicator and register, a case, a drawer in said case, an operating hand-lever, an indicating device, operating mechanism between the hand-lever and indicating device, a detent-lever on said indicator-operating mechanism, a registering device, operating mechanism between the hand-lever and registering device, and a registering-lever in said register-operating mechanism, combined with a locking-lever for said detent-lever adapted to be held disengaged from said lever by the drawer while the drawer is closed, but engaging said lever and locking the indicating device in position when the drawer is open, a locking-lever for said registering-lever, and a connection between the two locking-levers, whereby said register-locking lever is operated to lock and unlock the register in unison with the indicator-locking mechanism, for the purpose set forth.

8. In an indicator and register, a case, a drawer in said case, a registering device, an operating hand-lever having a rotary motion upon its longitudinal axis and a radial movement to and from the center on which it rotates, and connecting mechanism between the hand-lever and registering device, operating substantially as described, combined with a locking-lever for said registering device and suitable connecting mechanism between the locking-lever and the drawer in the case, whereby said locking-lever locks the registering device whenever the drawer is open, but unlocks it when the drawer is closed, for the purpose set forth.

9. In an indicator and register, an operating hand-lever, a pawl-carrying disk loosely mounted upon the register-shaft and rotated by a radial movement of the hand-lever through a suitable connecting mechanism, as described, a pawl pivotally attached to said disk, having a projecting pin or roll, and a ratchet-wheel firmly mounted upon the register-shaft and adapted to be engaged and rotated by the pawl to operate the registering device when the pawl is rotated, combined with a cam-shaped guard or gage loosely mounted upon the register-shaft and automatically adjusted upon the shaft during the setting of the indicating device by a rotary movement of the operating hand-lever through suitable connecting mechanism, as described, whereby the amount registered is exactly the same as that indicated, as set forth and described.

10. In an indicator and register, an indicating device, mechanism for operating said indicating device, a detent on said mechanism consisting of a disk, a series of notches or recesses on said disk and a detent-lever adapted to enter said recesses, and a stop projection at each end of the series of recesses to limit the movement of said disk, for the purpose set forth and described.

11. In an indicator and register, an indicating device, mechanism for operating said indicating device, a detent on said mechanism consisting of a disk, a series of notches or recesses on said disk and a detent-lever adapted to enter said recesses, a stop projection at each end of the series of recesses, and a dog on said detent-lever to adjust the limit of movement of said disk, and consequently the amount capable of being indicated by the indicating device, for the purpose set forth and described.

12. In an indicator and register, an operating hand-lever $d$, a main driving-shaft $c$, a gear or sector $c'$, a gear $e'$, and an indicating-dial $e$, combined with a detent-lever $g$, a notched or recessed disk $c^3$, and projections $c^5 c^5$, as and for the purpose set forth.

13. In an indicator and register, an operating hand-lever $d$, a main driving-shaft $c$, a gear or sector $c'$, a gear $e'$, an indicating-dial $e$, a detent-lever $g$, a notched or recessed disk $c^3$, and a bracket $d^4$ to lock said detent-lever within the notch or recess in said disk whenever said operating hand-lever is moved radially, as and for the purpose set forth.

14. In an indicator and register, an operating hand-lever $d$, a main driving-shaft $c$, a gear or sector $c'$, a gear $e'$, an indicating-dial $e$, and aperture $a^4$ in the case, combined with a gear or sector $c^2$, a pinion $f^2$, a sector $f'$, an index-finger $f$, and index $a^9$, whereby said indicating-dial and index-finger are moved together by the operating hand-lever, so as to indicate the same amount on each at all times, for the purpose set forth.

15. In an indicator and register, an operating hand-lever $d$, a registering-lever $i$, having a sector $i^2$ on one end thereof, a link $h$, connecting said hand and registering levers, a shaft $l$, a registering device operated by a rotary motion of said shaft, a gear $k$, loosely mounted on said shaft and operated by the sector $i^2$, a disk $k'$, attached to said gear, a pawl $k^2$, carried by said disk, and a ratchet-wheel $m$, firmly mounted on the shaft $l$ and engaged by the pawl $k^2$ to operate the registering device by a radial movement of the hand-lever, substantially as set forth.

16. In an indicator and register, an operating hand-lever $d$, a registering-lever $i$, having a sector $i^2$ on one end thereof, a link $h$, connecting said hand and registering levers, a shaft $l$, a registering device operated by a rotary motion of said shaft, a gear $k$, loosely mounted on said shaft and operated by the sector $i^2$, a disk $k'$, attached to said gear, a pawl $k^2$, having pin or roll $k^5$, carried by said disk, and a ratchet-wheel $m$, firmly mounted on the shaft $l$ and engaged by the pawl $k^2$ to operate the registering device by a radial movement of the hand-lever, combined with a main driving-shaft $c$, universally connected to the hand-lever, a gear $c^6$, mounted thereon, a gear $n^2$, meshing into the gear $c^6$, a gear $n'$, loosely mounted on the shaft $l$ and meshing into the gear $n^2$, and a guard or gage $n$, attached to the gear $n'$ and operated by a rotary movement of the hand-lever to limit the amount of movement imparted to the ratchet-wheel $m$ by the pawl $k^2$, for the purpose set forth and described.

17. In an indicator and register, an operating hand-lever $d$, a main driving-shaft $c$, a gear or sector $c'$, a gear $e'$, an indicating-dial $e$, a notched or recessed disk $c^3$, and a detent-lever $g$, combined with a drawer $a'$ in the case of the machine and a locking-lever $s$, adapted to move under said detent-lever to lock said indicating-dial in place when said drawer is in any other than a closed position, for the purpose set forth and described.

18. In an indicator and register, an operating hand-lever $d$, a registering-lever $i$, connecting mechanism, substantially as described, between said hand and registering levers, a registering device, and connecting mechanism, substantially as described, between said registering device and registering-lever, combined with a drawer $a'$ in the case of the machine, a locking-lever $s^2$, and connecting mechanism, substantially as described, between said drawer and locking-lever, whereby said locking-lever will engage said registering-lever and lock the registering device when said drawer is in any other than a closed position, for the purpose set forth and described.

19. In an indicator and register, a registering-device-operating mechanism, a registering-lever $i$, contained in said mechanism, and teeth $i^6$ on said lever, combined with a drawer-controlled locking-lever $s^2$ and teeth $s^5$ on said lever, for the purpose set forth.

20. In an indicator and register, a registering device, a registering-device-operating mechanism, an operating hand-lever $d$ and a registering-lever $i$, connected together and contained in said mechanism, and an adjustable screw-stop $i^5$ in said registering-lever, said registering device being operated by a radial movement of said hand-lever, combined with a drawer $a'$ in the case of the machine and a drawer-locking lever $p$, adapted to be operated to unlock said drawer by said screw-stop coming in contact with the end of said drawer-locking lever whenever said hand-lever reaches the end of its radial movement from its normal position, for the purpose set forth.

21. In an indicating and registering machine, the combination, with indicating and registering mechanisms, of an operating handle or lever having a universal joint, whereby said handle or lever may be both rotated upon its longitudinal axis and moved radially to and from the center on which it rotates, substantially as described, and co-operating mechanisms between said handle or lever and said indicating and registering mechanisms, for the purpose set forth.

22. In a register and indicator, the combination, with an indicator and a register-controlling gage, of an operating-handle having a rotary movement upon its longitudinal axis and a radial movement to and from its center of rotation, connected with and operating said indicator and gage simultaneously, for the purpose described.

23. In a register, the combination of a registering ratchet and pawl, an operating-handle having a rotary movement upon its longitudinal axis and a radial movement to and from its center of rotation, connecting with said ratchet and pawl so as to actuate them, substantially as described.

24. In a register, the combination of a stationary frame, a registering-ratchet supported by said frame, an operating handle or lever and connecting mechanism for actuating said ratchet by a radial movement of said handle or lever, an adjustable gage, and connecting mechanism for controlling the movement of said gage by a rotary movement of said handle or lever upon its longitudinal axis, substantially as described.

25. In a register, the combination of a registering ratchet and pawl, an adjustable gage or device for determining the extent of movement to be imparted to said ratchet by said pawl, an operating handle or lever having both a rotary motion upon its longitudinal axis and a radial motion to and from its center of rotation, and connecting mechanism between the ratchet, pawl, gage, and handle, whereby one of said movements of said handle or lever adjusts and fixes the position of said gaging device, and the other movement causes a movement of the registering-ratchet, for the purpose set forth.

26. In an indicator and register, the combination of a registering ratchet and pawl, an adjustable gage or device for controlling the movement of said ratchet, an indicator, and an operating handle or lever having both a rotary motion upon its longitudinal axis and a radial motion to and from its center of rotation, one of said movements adjusting and fixing the position of said gaging device and that of the indicator, and the other movement causing a movement of the registering-ratchet, for the purpose set forth.

In testimony whereof I have affixed my signature in presence of two witnesses.

DANIEL E. KEMPSTER.

Witnesses:
HENRY CHADBOURN,
M. H. AVERY.